United States Patent [19]

Arakawa et al.

[11] Patent Number: 4,931,313
[45] Date of Patent: Jun. 5, 1990

[54] METHOD OF FORMING A PROTECTIVE FILM FOR AN OPTICAL RECORDING MEDIUM

[75] Inventors: Nobuyuki Arakawa, Kanagawa; Hirotsugu Suzuki; Tokihiro Nishihara, both of Chiba, all of Japan

[73] Assignee: Sony Corporation, Tokyo, Japan

[21] Appl. No.: 238,524

[22] Filed: Aug. 31, 1988

[30] Foreign Application Priority Data

Sep. 3, 1987 [JP] Japan .................... 62-221082

[51] Int. Cl.$^5$ ............................ B05D 5/00; B05D 1/28
[52] U.S. Cl. .................................... 427/164; 427/162; 427/428; 427/429
[58] Field of Search ............... 101/376, 379; 427/162, 427/428, 164, 429; 118/263, 264

[56] References Cited

U.S. PATENT DOCUMENTS 4,479,432 10/1984 Masaki et al. .................... 101/151 X

FOREIGN PATENT DOCUMENTS 2653831 6/1978 Fed. Rep. of Germany ...... 427/162
58-137146 8/1983 Japan .................... 427/162

*Primary Examiner*—Evan Lawrence
*Attorney, Agent, or Firm*—Hill, Van Santen, Steadman & Simpson

[57] ABSTRACT

A method of forming a protective film for an optical recording medium. A protective film forming ink having a viscosity in a range between 0.9 and 100 ps is applied on a surface of a pad, e.g., a semispherical pad, having a Shore A hardness between 8 and 30. The spherical surface of the pad thus applied with the ink is pressed to a substrate of the optical recording medium on which a reflective layer is formed to transfer the protective film forming ink to the surface of the substrate so as to cover the entire surface of the reflective layer and extend over the peripheral edges. Then, the ink is cured to form the protective film.

5 Claims, 6 Drawing Sheets

FIG. 2A₁
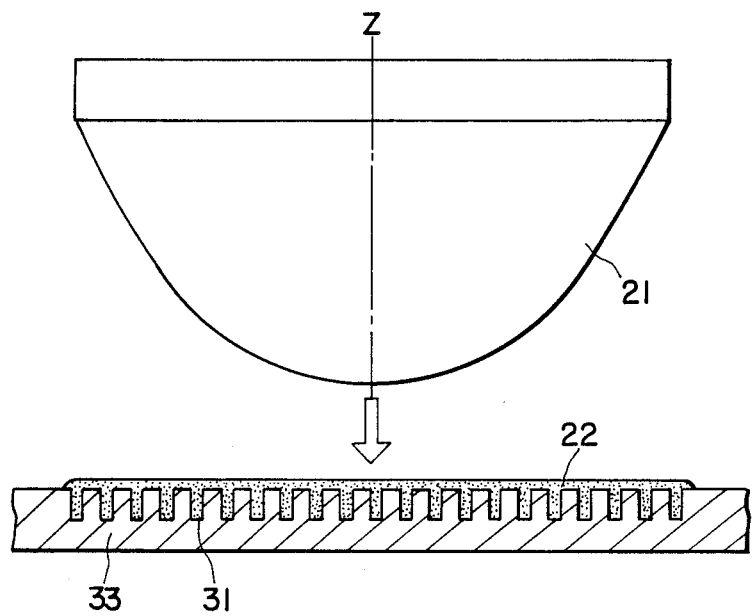
FIG. 2A₂
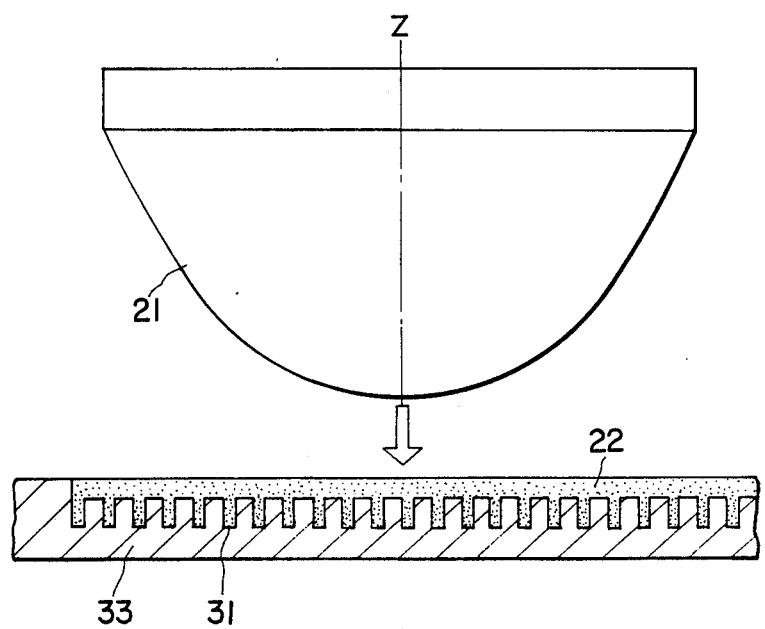

METHOD OF FORMING A PROTECTIVE FILM FOR AN OPTICAL RECORDING MEDIUM

BACKGROUND OF THE INVENTION

The present invention relates to a method of forming a protective film for an optical recording medium such as a compact disk (CD), a video disk or a magneto optical recording disk.

In manufacturing an optical recording medium such as compact disks (CD), small holes serving as information pits are formed at least in one surface of a substrate, for example, a transparent substrate formed of polymethyl methacrylate resin (PMMA) or polycarbonate resin (PC), in molding the substrate, an evaporated metallic film serving as a reflective film or a recording layer is formed over the surface having the information pits, and a protective film having a thickness in the range of several microns to several tens microns and formed of a transparent resin, such as an ultraviolet ray curing resin or lacquer, is formed over the evaporated metallic film.

The substrate having the information pits is formed by a stamping process using a stamper having protrusions corresponding to the information pits by an injection molding process using the same stamper disposed in a mold or by a so-called 2P process (photoplymerization process) in which an ultraviolet ray curing resin is filled between a flat resin plate having good optical characteristics and a stamper, and then the ultraviolet ray curing resin is irradiated by ultraviolet rays to cure the resin.

Generally, the protective film is formed by a spin-coating method. However, the spin-coating method entails various problems. For example, as shown in FIG. 3, in forming the substrate by an injection molding process, a stamper 1 having a surface carrying a pattern of pits complementing the pattern of information pits is placed on a movable mold 2, a fixed mold 3 is held over the movable mold 2 so as to form a cavity 4 between the movable mold 2 and the fixed mold 3, and then a resin is injected through a sprue 5 into the cavity 4. In FIG. 3, indicated at 6 and 7 are a die and a punch, respectively, for forming a central hole in the substrate. Since the stamper 1 is held along the inner and outer peripheries thereof by stamper holders 8 and 9, an annular groove 12 as shown in FIG. 4 corresponding to the stamper holder 8 is formed in the molded substrate 11 having information pits 10 respectively corresponding to the protrusions of the stamper 1. Then, as shown in FIG. 5 or 6, a reflective film or a recording layer 13, such as an aluminum film formed by vacuum evaporation, having a thickness in the range of 600 Å to 1500 Å is formed over the surface having the information pits 10 of the substrate 11, and then a protective film 14 is formed over the recording layer 13 to complete an optical recording medium, for example, a CD 16. Indicated at 17 is the central hole.

In forming the protective film 14 of the CD having a construction as shown in FIG. 5, the outer peripheral region and inner peripheral region including the annular groove 12 of the substrate 11 are covered selectively with a mask 15 as shown in FIG. 7 by way of example, the reflective film or the recording layer 13 is formed selectively in the region in which the information pits 10 are formed, for example, by an aluminum evaporation process, the mask 15 is removed, and then the substrate 11 is rotated and an ultraviolet ray curing resin, for example, is dropped on the substrate 11 at a position indicated by an arrow a in FIG. 5, namely, a position radially outside the annular groove 12 and radially inside the region in which the reflective film or the recording layer 13 is formed, to form the protective film 14. Since the protective film 14 is formed over the entire surface of the reflective film or the recording layer 13 including the circumference of the reflective film or the recording layer 13, the reflective film or the recording layer 13 can surely be protected. However, as mentioned above with reference to FIG. 7, troublesome work required for forming and removing the mask 15 is an obstacle to mass production.

On the other hand, in forming the protective film 14 of the CD having a construction as shown in FIG. 6, the reflective film or the recording layer 13 is formed over the entire region having the information pits 10 of the substrate 11 including the annular groove 12, for example, by an aluminum evaporation process without using any mask 15, and then the protective film 14 is formed similarly over the entire region having the information pits 10 by a spin-coating process. In this case, the troublesome work for forming and removing the mask 15 is unnecessary. However, radial irregularities appear in the protective film 14 in a region outside the annular groove 12 due to the adverse effect of the annular groove 12 entailing the degradation of the commercial value and the edges of reflective film 13 are not covered by the protective film 14, which results in the erosion of the reflective film 13 from the edges.

OBJECT AND SUMMARY OF THE INVENTION

Accordingly, it is an object of the present invention to provide an improved method of forming a protective film for an optical recording medium.

It is another object of the present invention to provide a method of forming a protective film for an optical recording medium in which a reflective film or a recording layer is surely covered by the protective film.

It is further object of the present invention to provide a method of forming a protective film for an optical recording medium suitable for mass production of the optical recording medium with a simplified process.

According to one aspect of the present invention, there is provided a method of forming a protective film for an optical recording medium comprising steps of:
  applying a protective film forming ink having a viscosity in a range of 0.9 to 100 poise (ps) to a pad having a Shore A hardness in a range of 8 to 30; and
  pressing the pad against a substrate to transfer the protective film forming ink to the substrate in a protective film.

DESCRIPTION OF THE PREFERRED EMBODIMENTS

In accordance with the present invention, a protective film is formed over the surface of a substrate by applying a protective film forming ink having a viscosity in the range of 0.9 to 100 poise (ps), preferably, 10 to 50 ps, to the surface of a pad, such as a bulged pad or a roller pad, having a Shore A hardness in the range of 8 to 30, and by pressing the pad against the substrate to transfer the protective film forming ink onto the substrate.

Although the method of the present invention finishes the surface of the protective film in a matte surface, the protective film formed by the method of the present invention is free of imperfections, such as pinholes and irregularities, and is uniform. The reproducibility of the protective film formed by the method of the present invention proved satisfactory.

Now, the present invention will be explained in detail with reference to specific embodiments.

EXAMPLE 1

Figure 1A:
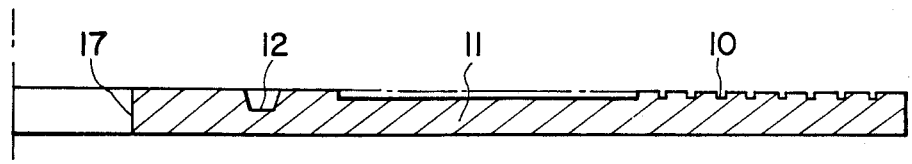
FIGS. 1A to 1E are schematic illustrations to explain the steps of a method of forming a protective film for an optical recording medium in a preferred embodiment according to the present invention.
Figure 3:
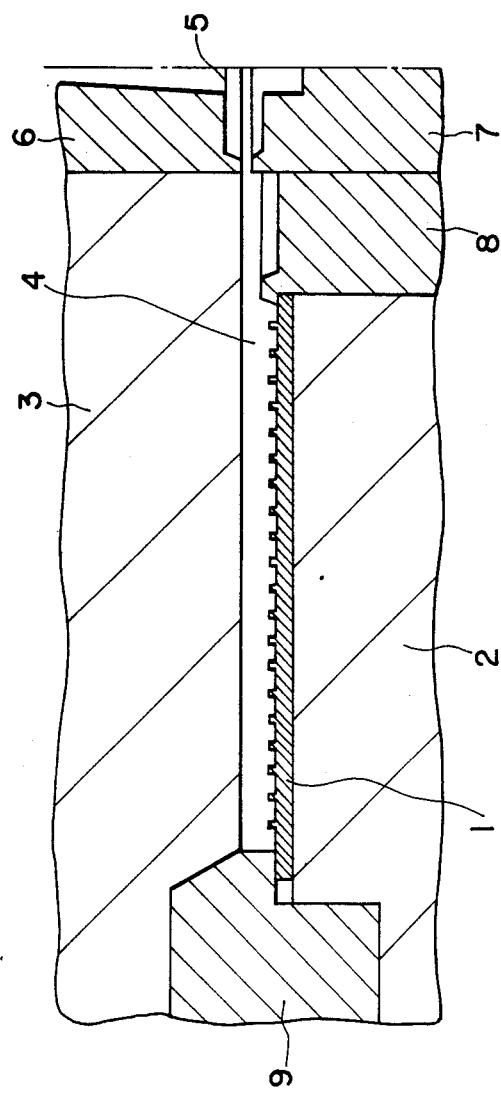
FIG. 3 is a sectional view of an arrangement for forming a substrate of a optical recording medium.
Figure 4:
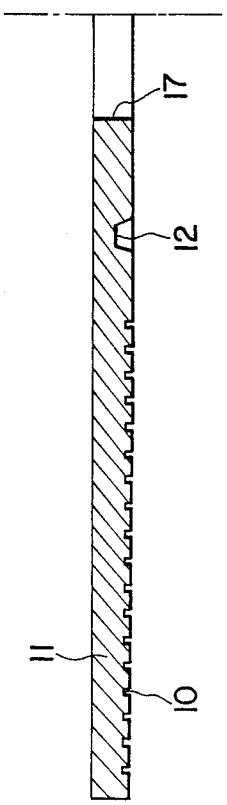
FIG. 4 is a sectional view of a substrate, in which only the half of the substrate is shown.
Figure 5:
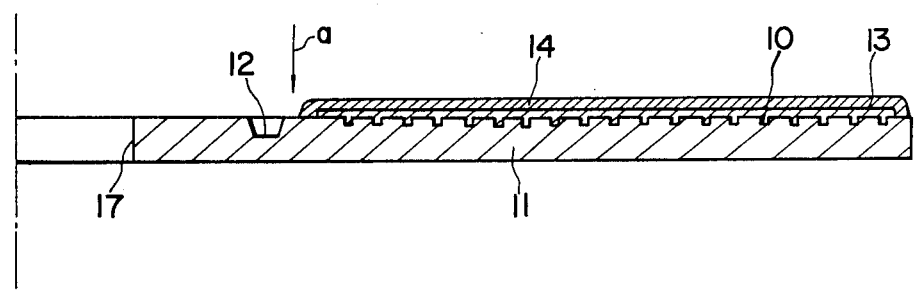
FIGS. 5 and 6 are sectional views of an optical recording medium, in which only the half of the optical recording medium is shown.
Figure 6:
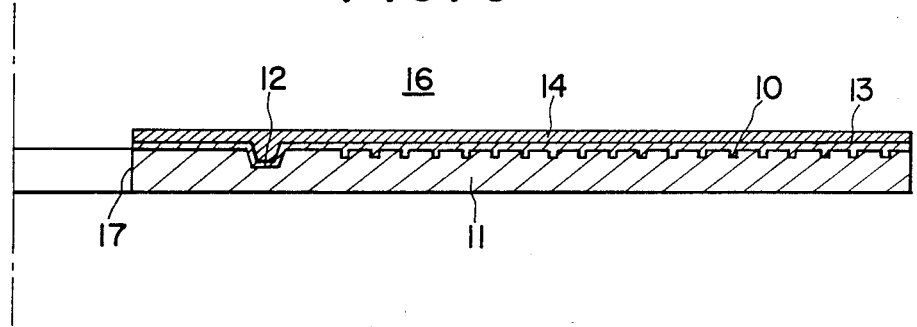
Figure 7:
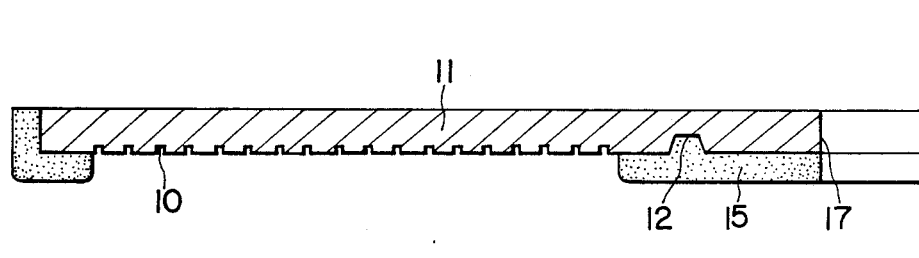
FIG. 7 is sectional view to explain a conventional method of forming a protective film for an optical recording medium.

A first embodiment of the present invention will be described with reference to FIGS. 1A through 1E, in which parts the same or corresponding to those previously described with reference to FIG. 4 are denoted by the same reference numerals and the description thereof will be omitted. A transparent substrate 11 having information pits as shown in FIG. 1A formed of PMMA or PC by the foregoing known technique, such as the method described with reference to FIG. 3, is used.

Figure 1B:
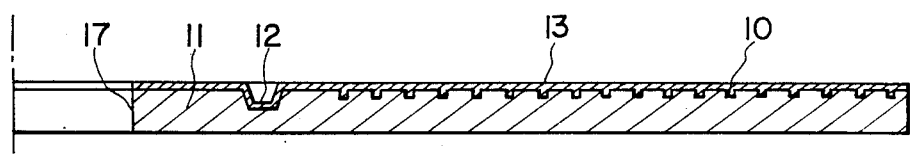

Then, as shown in FIG. 1B, a reflective film or a recording layer 13 having a thickness in the range of 600 Å to 1500 Å is formed over the entire region having information pits 10 in the surface of the substrate 11, for example, by an aluminum evaporation process.

Figure 1C:
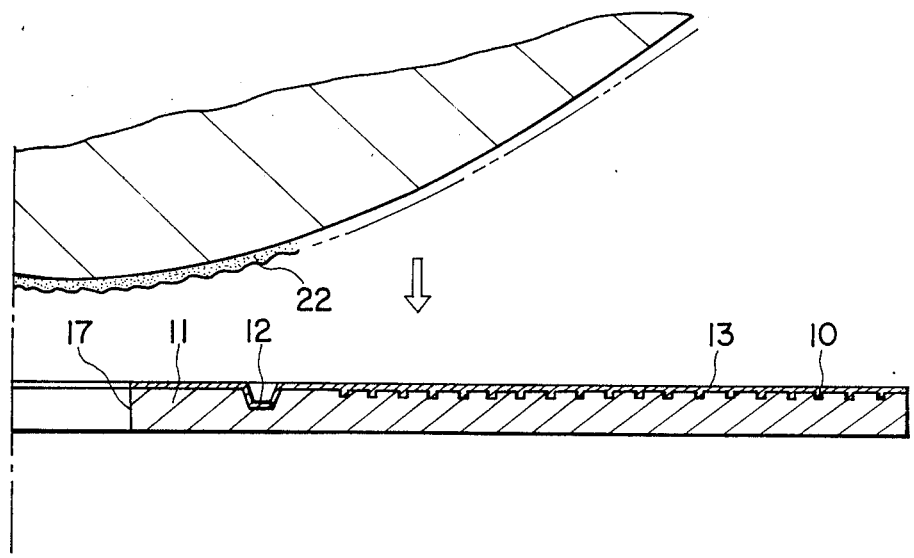

A protective film forming ink 22 is applied to the printing surface of a printing pad 21, for example, a bulged printing pad, as shown in FIG. 1C.

Figure 1D:
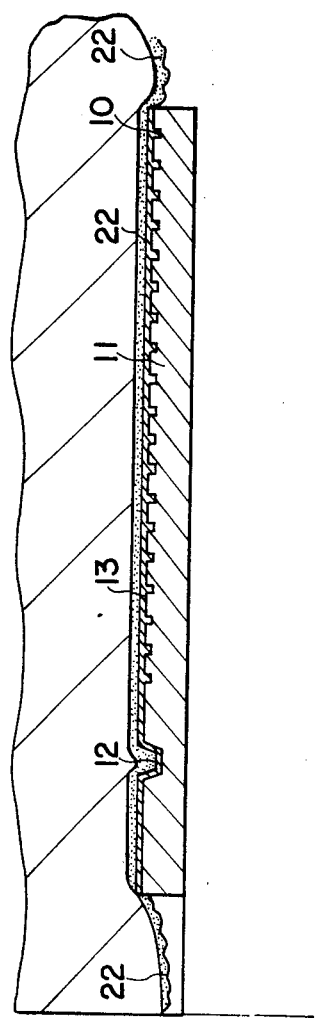
Figure 1E:
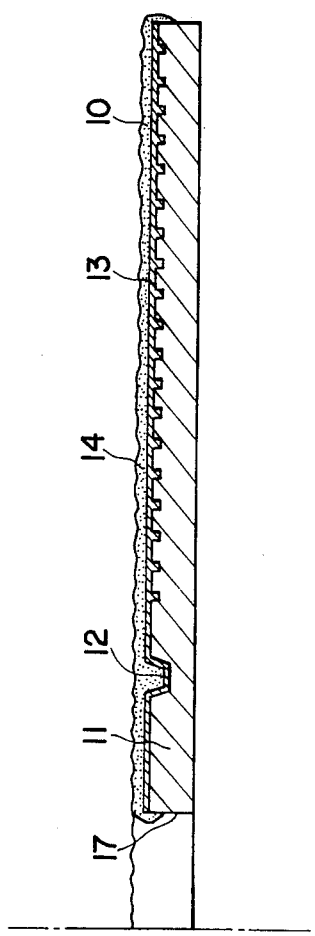

As shown in FIG. 1D, the printing pad 21 is moved, relative to the substrate 11, toward the substrate 11 and is pressed against the substrate 11 to transfer the ink 22 onto the entire surface of the substrate 11.

The layer of the ink 22 thus formed over the entire region having the information pits 10 in the surface of the substrate is hardened, for example, by ultraviolet ray irradiation to form a protective film 14. Since the pad 21 is elastically flexible, the pad 21 is deforms when pressed against the substrate 11 so as to extend over the outer circumference of the substrate 11 and in the central hole 17, so that the outer circumference of the reflective film or the recording layer 13 and the inner circumference of the substrate 11 defining the central hole 17 are coated with the protective film 14.

Figure 2B:
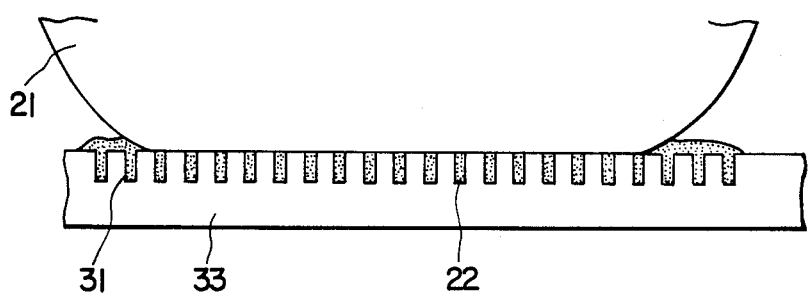
FIGS. 2A$_1$, 2A$_2$, 2B and 2C are schematic illustrations to explain a manner of applying a protective film forming ink to a pad.
Figure 2C:
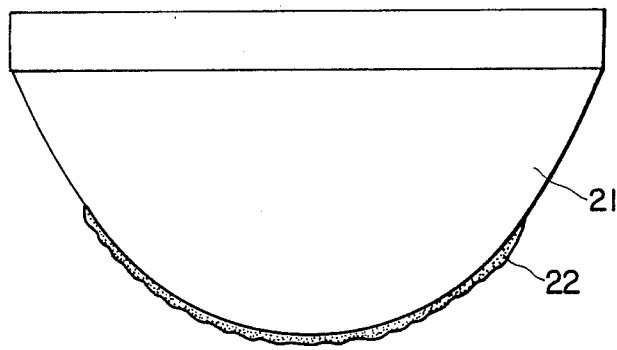

The pad 21 is formed, for example, of a RTV (room temperature vulcanized) silicone resin having a Shore A hardness in the range of 8 to 30 in a spindle-shape rotationally symmetric with respect to an axis Z or in a semispherical shape as shown in FIGS. 2A$_1$ and 2A$_2$. The ink has a viscosity in the range of 0.9 to 100 poise. The ink is applied to the pad 21 by using, for example, a plate 33 provided with minute pits 31 having a depth in the range of 25 to 35 μm distributed in a density on the order of 100 mesh (95% in aperture ratio) as shown in FIG. 2A$_1$ or a plate 33 provided with the same minute pits 31 distributed in the same density in the bottom surface of a recess 32 as shown in FIG. 2A$_2$. The protective film forming ink 22 is squeezed out from an ink tank to fill up the minute pits 31 of the plate 33 of FIG. 2A$_1$ or the minute pits 31 and recess 32 of the plate 33 of FIG. 2A$_2$, and the excessive protective film forming ink 22 is scraped off, for example, with a doctor blade. Then, as shown in FIG. 2B, the printing pad 21 is pressed against the plate 33 of FIG. 2A$_1$ or 2A$_2$ to transfer the ink 22 applied to the plate 33 to the printing surface of the pad 21 as shown in FIG. 2C. Then, the pad 21 coated with the ink 22 is pressed against the substrate 11 as mentioned with reference to FIG. 1D to transfer the ink 22 to the substrate 11.

The protective film forming ink 22 is prepared in an appropriate viscosity by mixing a photosetting oligomer or polymer preferably having at least two acrylic double bonds in a single molecule, such as epoxy acrylate, polyester acrylate or epoxy urethane acrylate, and, if necessary, and a diluent, such as 2-hydroxyethyl (meta)acrylate, trimethylolpropane tri(mata)acrylate, pentaerythritol tetra(meta)acrylate or ethylene glycol di(meta)acrylate of a radiation curable monomer having acrylic double bonds, and then adding a radical initiator, such as benzoin ethyl ether, diacetyl benzoin to the mixture to initiate photopolymerization.

A protective film forming ink 22 (ultraviolet ray curing resin coating: "Raycure 4100®", Jujo Kako K.K.) having a viscosity of 40 ps (poise) was applied to a substrate 11 at a transfer speed of 3 sec by a rotationally symmetric printing pad 21 of a paraboloidal shape having an axis Z of symmetry, formed of a silicone resin in a Shore A hardness in the range of 19 to 20 according to the method described with reference to FIGS. 1A through 1E. Then, the film of the protective film forming ink 22 was irradiated by ultraviolet rays by means of a high-pressure mercury-vapor lamp to form a protective film 14.

The adhesive strength of the protective film 14 thus formed was measured. In measuring the adhesive strength, a pressure-sensitive adhesive tape of 15 mm in width was applied to the protective film 14, and then the pressure-sensitive adhesive tape was peeled off by pulling the same back. The protective film 14 was not peeled when the peeling force was 300 g, while a protective film formed by a conventional spin-coating method was peeled by a peeling force on the order of 70 to 80 g.

COMPARATIVE EXAMPLE

A protective film was formed as a comparison by the same process as that of the first embodiment, except that the viscosity of the protective film forming ink 22 was 30 centipoise (cps).

When the protective film forming ink 22 was transferred onto the substrate 11 by the printing pad 21, the ink cohered to form an uneven protective film.

Although the bulged pad 21 was used for transferring the protective film forming ink 22 onto the substrate 11 in forming the foregoing examples, the protective film forming ink 22 may be transferred onto the substrate 11 by rolling a roller pad, which is employed in rotary printing, relative to the substrate 11. Another embodiment employing such a roller pad will be described hereinafter.

EXAMPLE 2

A roller pad of 120 mm in outside diameter formed of a RTV silicon resin having a Shore A hardness in the range of 13 to 15 was used. The roller pad was rotated at 53 rpm and at a relative speed of 20 m/min relative to a substrate 11 to apply Raycure 4100 ® (Jujo Kako K.K.) in a thickness in the range of 10 to 15 μm. A protective film 14 of uniform thickness was formed.

It was proved that the method of the present invention is capable of forming a protective film 14 having a matte surface and free from imperfections without using any mask over the entire surface of a region having information pits 10 in the surface of a substrate 11 including the outer and inner circumferences of a reflective film or a recording layer 13 and an annular groove 12 of, for example, a depth on the order of 0.3 mm. Thus, the reflective film or the recording layer 13 formed of aluminum or the like is covered perfectly and is protected from corrosion by the moisture resistance of the protective film 14, which enhances the reliability of the optical recording medium 16.

In practicing the method of the present invention, it was proved that the ink 22 can properly be transferred from the pad 21 onto the substrate 11 without entailing imperfections such as the coherence of the ink 22, insufficient application and pinholes under comparatively wide range of coating conditions including pressure for pressing the pad 21 against the substrate 11 and transfer time, when the viscosity of the protective film forming ink 22 is in the range of 0.9 to 100 ps, preferably, 30 to 80 ps, and the Shore A hardness A of the pad 21 is in the range of 8 to 30. Incidentally, when the Shore A hardness of the pad was less than 8, the leveling performance of the pad was unsatisfactory and there is a possibility that pinholes are formed in the protective film and, when the Shore A hardness was higher than 30, it was necessary to apply an increased pressure to the pad to transfer the ink to the substrate and error rate increased.

As is apparent from the foregoing description, according to the present invention, the elimination of a mask simplifies the manufacturing process, the error rate is reduced, and the protective film 14 having a matte surface facilitate labeling the CD.

We claim as our invention

1. A method of forming a protected optical recording medium having a recording layer on a substrate comprising steps of:
    applying a protective film forming ink having a viscosity in a range of 0.9 to 100 poise to a pad having a Shore A hardness in a range of 8 to 30; and
    pressing the pad against the recording layer on the substrate to transfer the protective film forming ink to the recording layer in a protective film that extends over the peripheral edges of the recording layer.

2. A method according to claim 1, further comprising a step to cure said protective film forming ink on said recording layer.

3. A method according to claim 1, wherein said protective film forming ink has a viscosity in a range between 30 and 80 poise.

4. A method according to claim 1, said pad has a spindle-shape rotationally symmetric with respect to a center axis, or a semispherical shape.

5. A method according to claim 4, wherein said optical recording medium substrate is rotatable about the central axis perpendicular to the plane of the substrate and said pad is pressed against said substrate so that said center axis coincides with the central axis of said substrate.

* * * * *